July 1, 1947.     E. CARRANZA     2,423,371
POLARTOSCOPE
Filed July 26, 1944
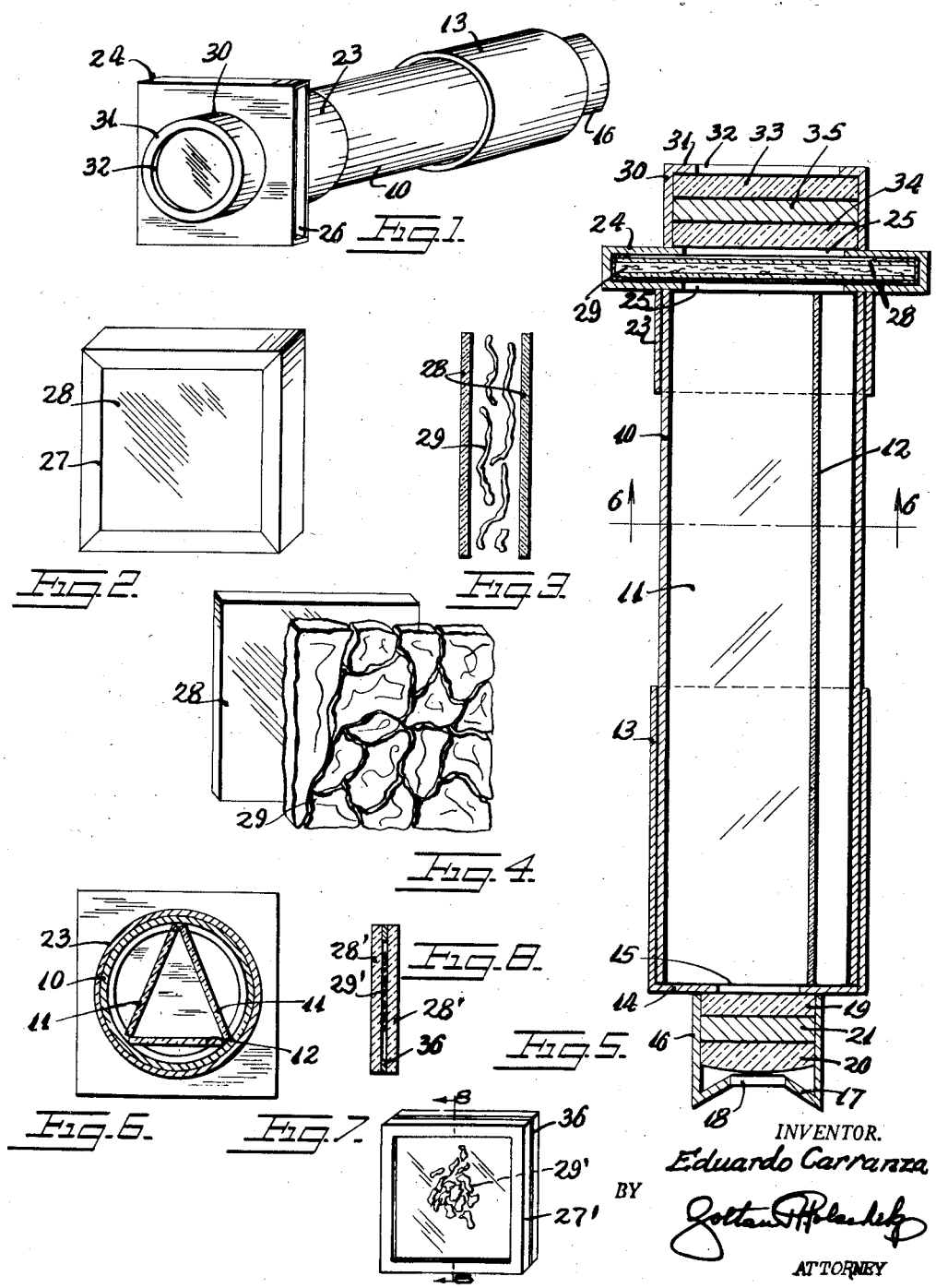
INVENTOR.
Eduardo Carranza
BY
ATTORNEY Patented July 1, 1947

2,423,371

UNITED STATES PATENT OFFICE 2,423,371

POLARTOSCOPE

Eduardo Carranza, Dunellen, N. J.

Application July 26, 1944, Serial No. 546,648

1 Claim. (Cl. 88—15)

This invention relates to new and useful improvements in a kaleidoscope.

More specifically, it is proposed to provide a polartoscope which is a kaleidoscope employing polarized light.

Still further, it is proposed to provide a kaleidoscope characterized by a Polaroid lens adapted to be employed in effecting the color changes of the kaleidoscope design.

Still further it is proposed to provide a kaleidoscope in which a fixed design-producing sheet of material is employed.

Still further it is proposed to provide a kaleidoscope as aforesaid employing two spaced Polaroid films, one at either end of the kaleidoscope.

Still further it is proposed to provide a kaleidoscope as aforesaid in which the color of a fixed design can be made to undergo innumerable changes.

Still further it is proposed to provide a kaleidoscope as aforesaid employing a fixed sheet of design-producing material subject to color changes by means of Polaroid film and to design changes by rotation relative to reflecting mirrors.

A further object is to provide a kaleidoscope adapted to receive numerous slides successively each having a different design-forming sheet of material.

Another object is to provide a kaleidoscope employing a slide or a sheet of material of transparent wrinkled or superimposed fragments of Cellophane.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a perspective view of a kaleidoscope constructed in accordance with the present invention.

Fig. 2 is a perspective view of a slide adapted to be used with the kaleidoscope.

Fig. 3 is a sectional view of portions of the slide of Fig. 2 unbound.

Fig. 4 is a perspective view of the Cellophane sheet and a cover slide spaced therefrom forming a part of the slide of Fig. 2.

Fig. 5 is a longitudinal section through the kaleidoscope with a slide assembled therewith.

Fig. 6 is a section on the line 6—6 of Fig. 5.

Fig. 7 is a perspective view of another type of slide adapted to be used with the kaleidoscope of the present invention.

Fig. 8 is a section on the line 8—8 of Fig. 7.

The kaleidoscope, according to this invention, which, since its light is polarized, as will presently appear, might better be called a polartoscope, comprises a tube 10 in which is disposed a triangular device including a pair of mirrors 11 inclined to each other at forty-five degrees and an opaque sheet 12. A tube 13 is telescoped over the rear end of the tube 10 for rotation thereon, tube 13 having an end wall 14 provided with an orifice 15. An eye piece 16, having an end wall 17 provided with an orifice 18 is secured to end wall 14. In this eye piece are disposed a disc of clear glass 19 over orifice 15, a plano-convex lens 20 over orifice 18 with its convex surface adjacent the orifice, and a disc of Polaroid film 21 cemented between the disc 19 and lens 20.

The disc of Polaroid film is conventional material adapted to polarize light, it having the many usual parallel lines. As Polaroid film is well known, no further description thereof or of its operation will be given. The disc 21 of Polaroid film is rotated relative to tube 10 by means of the tube 13.

A tube 23 is telescoped over the front end of tube 10. A rectangular slide carrier 24 is secured to the front end of the tube and is provided in its walls extending over the end of the tube 10 with circular orifices 25. The carrier is provided with a slot 26 in one side for receiving slides. One such slide 27 is shown in Figs. 2-4. It includes two square sheets of clear cover glass 28 between which is disposed a sheet of material 29 for providing the designs of the kaleidoscope. Sheet 29 may be made of superimposed fragments of wrinkled Cellophane or other plastic, this having been found to be one form of sheet which provides excellent designs and geometric figures for the kaleidoscope. Other forms of suitable sheets may be employed if desired. It is contemplated that different slides will be employed with the kaleidoscope to provide different kinds of designs. However, if desired, as in the case of the common kaleidoscope used as a toy, the kaleidoscope could be constructed, in an obvious manner, with one sheet of wrinkled Cellophane fragments permanently secured at the end of the mirrors. Such a construction would provide an unchanging design subject only to color changes due to Polaroid light as will presently appear. However, it is deemed more desirable to be able to employ a large variety of slides in the kaleidoscope, and to move each slide therein so that different effects may be obtained as will presently appear.

A tubular retainer member 30 is secured to the front of the carrier 24. It has a front wall 31 provided with an orifice 32, orifices 32, 25, 15 and 18 all being in line and in line with the interior of the triangular member formed by the mirrors 11 and the opaque sheet 12. Thus a person looking through orifice 18 can see light entering the kaleidoscope at the orifice 32.

Three discs are disposed in member 30, there being a disc of translucent glass 33 over orifice 32, a disc of clear glass 34 over the adjacent orifice 25 and a disc of Polaroid film 35 cemented between the two discs. Disc 35 may be similar to disc 21 but larger in diameter.

Tube 23 is rotatably mounted on tube 10. However, if desired in some kaleidoscopes, it may be fixed thereto. The advantage of having it rotatable is that then the slide can be rotated relative to the mirrors, thereby changing the design.

It is contemplated that the Polaroid kaleidoscope will provide schools and colleges with a means of arousing the interest of their pupils in the study of polarization of light. Furthermore, the polartoscope will provide industries and artists with means of easily obtaining varied harmonious coloring to any given design. The polartoscope will also provide amusement for both adults and children.

The tubes and other portions of the polartoscope outside of the Polaroid film and glass may be made of any suitable material such as cardboard, plastic or metal, and the parts may be assembled in any desired and well known manner.

The operation of the polartoscope is as follows:

A person using the polartoscope first slides a slide 27 in the carrier 24 through the slot 26. He then looks through the orifice 18. He will see a harmonious design in symmetrical patterns in a similar manner as he would see such a design in a conventional kaleidoscope. However, this design he sees in the polartoscope will be the result of polarized light showing through a fixed sheet of material. In this respect it differs vastly from conventional kaleidoscopes which merely employ a plurality of separate movable colored fragments of glass or other transparent material. The design seen through the polartoscope will have a configuration dependent upon the wrinkled sheet of Cellophane fragments, and this design will have colors dependent upon the Polaroid films.

If the eye piece alone is rotated relative to the rest of the polartoscope, the colors of the design will change, due to the different relative positions of the Polaroid films, but the design will remain the same. Thus it is possible to find different color combinations for a given design. If the slide and adjacent Polaroid film are rotated relative to the mirrors (the eye piece being stationary) both the design and the colors will change.

To obtain further different designs, different slides may be placed in the carrier 24. With any particular design given, the color can be made to undergo innumerable changes by rotating the ocular end of the instrument as aforesaid. It is to be noted that the sheet of material providing the designs is fixed. That is to say, the fragments cannot move relative to each other as they do in an ordinary kaleidoscope.

If desired, a changeable design may be employed. A slide 27' providing such a design is shown in Figs. 7 and 8. It is formed of two sheets of cover glass 28' separated by a frame 36 to which the glasses 28' are glued. A plurality of loose fragments of Cellophane 29' are disposed in the frame. By shaking the slide the arrangement of the fragments may be changed to change the design. The slide is employed similarly to slide 27.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

A kaleidoscope comprising a hollow tube, light-reflecting mirrors at an angle to each other and in lengthwise arrangement in said tube, an eye-piece rotatably mounted on one end of said tube including a cemented unit comprising a lens, a Polaroid film inwardly of and adjacent the plane face of said lens, and a translucent glass plate inwardly thereof, a slide-carrier disposed at the other end of said tube, a design-providing slide in said carrier having a sheet of wrinkled fragments of plastic, a Polaroid film adjacent said slide-carrier, and a sheet of translucent glass adjacent the outer face of said last mentioned Polaroid film and cemented thereto said slide carrier being adapted to receive successively a number of slides.

EDUARDO CARRANZA.

REFERENCES CITED

The following references are of record in the file of this patent:

UNITED STATES PATENTS

| Number | Name | Date |
| --- | --- | --- |
| 151,005 | Bush | May 19, 1874 |
| 1,662,743 | Hanson | Mar. 13, 1928 |
| 1,885,642 | Strong | Nov. 1, 1932 |
| 2,184,138 | Corey | Dec. 19, 1939 |
| 2,256,093 | Land | Sept. 16, 1941 |
| 2,263,684 | Ryan | Nov. 25, 1941 |
| 163,173 | Ferris et al. | May 11, 1875 |
| 2,038,909 | Smith et al. | Apr. 28, 1936 |
| 2,152,424 | Wetmore | Mar. 28, 1939 |
| 1,690,602 | Trivelli | Nov. 6, 1928 |

FOREIGN PATENTS

| Number | Country | Date |
| --- | --- | --- |
| 2,290 | Great Britain | 1873 |